G. HERSHKOVITZ.
FLOWER POT AND JACKET FOR THE SAME.
APPLICATION FILED AUG. 13, 1909.
955,644.
Patented Apr. 19, 1910.
2 SHEETS—SHEET 1.
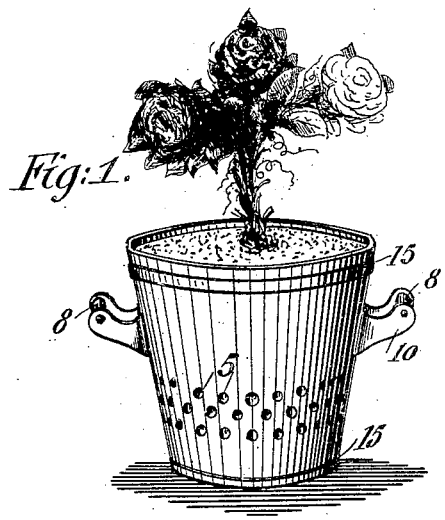
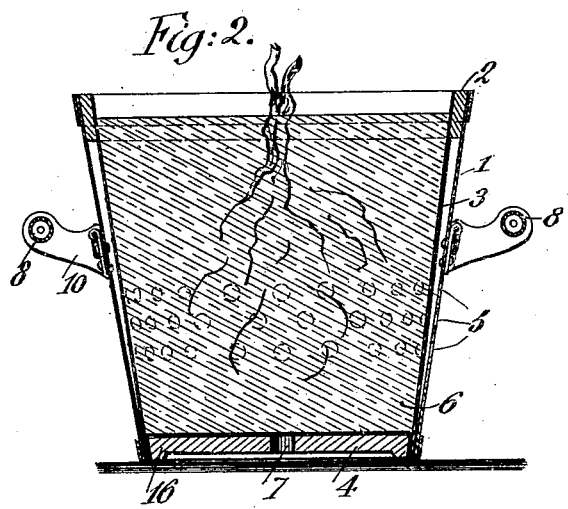

G. HERSHKOVITZ.
FLOWER POT AND JACKET FOR THE SAME.
APPLICATION FILED AUG. 13, 1909.
955,644.
Patented Apr. 19, 1910.
2 SHEETS—SHEET 2.
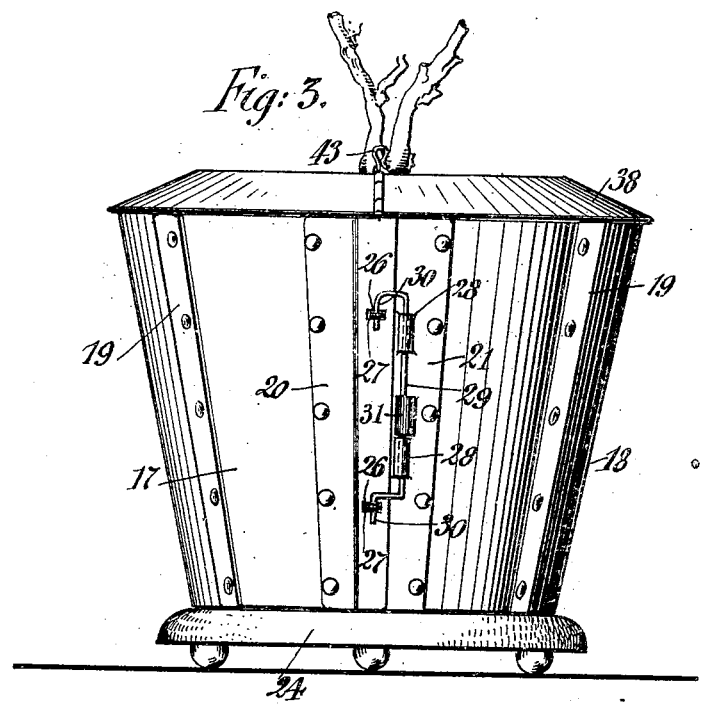
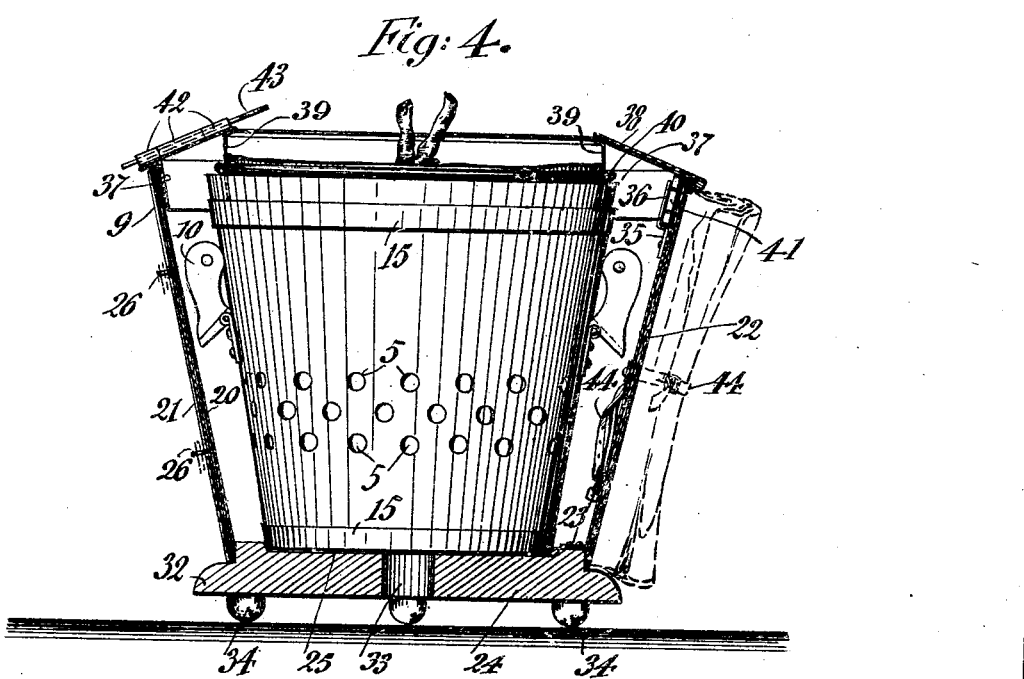

UNITED STATES PATENT OFFICE.

GERSON HERSHKOVITZ, OF NEW YORK, N. Y.

FLOWER-POT AND JACKET FOR THE SAME.

955,644.

Specification of Letters Patent. Patented Apr. 19, 1910.

Application filed August 13, 1909. Serial No. 512,658.

*To all whom it may concern:*

Be it known that I, GERSON HERSHKOVITZ, a citizen of the Kingdom of Hungary, residing in New York, borough of Brooklyn, county of Kings, and State of New York, have invented certain new and useful Improvements in Flower-Pots and Jackets for the Same, of which the following is a specification.

This invention relates to an improved form of flower-pot and has for its object to provide a jacket for flower-pots which will form a sightly covering and which will protect the roots and soil in the pot from sudden changes of temperature.

It is understood that various changes may be made in the construction without departing from the spirit and scope of the invention.

In the accompanying drawing, in which like reference characters refer to like parts throughout the several views, Figure 1 is a perspective view of the pot with the outer covering or jacket removed, Fig. 2 is a central vertical sectional view of the pot, Fig. 3 is a side-elevation of the pot, with the jacket thereon, and Fig. 4 is a side-view of the pot with the jacket therefor shown in vertical section, the dotted lines indicating how the jacket may be rolled back together.

My improved jacket is shown applied to an inner- or pot proper, comprising a metallic side-wall 1 having the inwardly projecting flange 2, at its upper edge, the lining 3 and the conical bottom 4 fitting tightly within the side-wall and holding the bottom edge of the lining in place. The upper edge of the lining rests against the flange 2 and holds the lining spaced from the metallic side-wall. The wall is perforated as at 5 and the lining is made of tar-paper or other substance impervious to water. By this arrangement the water of the soil 6 is prevented from coming in contact with and corroding the metallic side-wall, while the air may pass through the perforations 5; and no corrosive substance or the like is formed, or permitted to mingle with the soil to the injury of the plant.

The bottom 4 may be made of any suitable wood or substance and provided, as is usual, with the central draining-hole 7.

The pot is provided with handles 8, mounted on side-pieces 10 adapted to fold against the side of the pot. The side-wall of the flower-pot may be of any desired metal such as galvanized iron or zinc, and is provided with upper and lower bands 15 of brass, copper or any contrasting or desired metal, whereby a very ornamental pot is produced, and this pot may, if desired, be used without the jacket 9. A flange 16 may be provided to hold the bottom 4 spaced from its support, to give better passage of air and water through the hole 7 and from under the bottom. The jacket 9 comprises two members 17 and 18 of canvas, leather or any desired or suitable material, each stiffened by substantially vertical metallic intermediate-ribs 19 and end-ribs 20 and 21, all riveted to the canvas or secured thereto in any suitable manner.

The inner ends of the members 17 and 18 are riveted to the side-edges of the broad fixed-rib 22, which is provided with an inner lower flange 23 through which are passed screws to secure the fixed-rib to the circular base 24 provided with a circular recess 25 for the reception of the inner- or pot proper. The end-rib 20 is provided with upper and lower perforated projecting ears 26, which pass through slots 27 in the rib 21. The rib 21 is provided with upper and lower lugs 28 having alined bores in which slides the rod 29 carrying the upper and lower locking hooks 30 adapted to slide into the perforations of the ears 26, whereby the outer ends of the members 17 and 18 are firmly locked together. A laterally projecting thumb-hold or handle 31 is rigidly secured to an intermediate part of the rod 29 and serves, not only for a handle to slide the rod, but also as a shoulder to limit the upward and downward movement of the rod. A laterally projecting lower flange 32 on the base 24 serves as a shoulder to hold the jacket 9 in its proper position at the lower edge. A drain-hole 33 is provided to drain the water from the circular recess 25, and feet or knobs 34 hold the base 24 spaced from whatever support it may be rested upon. One or more bent plates 35 are secured to the upper end of the fixed-rib 22 and these plates have upturned ends spaced from and parallel to the upper end of the fixed-rib. Between these ends 36 and the fixed ribs, is received the downwardly projecting outer flange 37 of the collar 38. The upper edge of the jacket 9 is placed around this outer flange and is engaged by said flange and said collar. An inner flange 39 rests within the flange 2, and an annular shoulder 40 limits the downward movement of the flange 39 and the parts secured thereto. In order that the collar 38 may be removed from or placed around plants having abundant foliage or branches, it is made of two members having a hinge 41 connecting one pair of the adjacent ends. The free ends of these members are provided with upturned lugs 42 having alined bores through which is passed the locking pin 43 which is hooked at its inner end to form a shoulder to limit the outward and downward movement of the pin. In order to hold the collar 38 rigidly in place before and after placing the jacket 9 therearound, the flange 37 is placed between the ends 36 and the plates 35 with the hinge 41 resting between adjacent ones of said ends.

The flower pot may be used with the jacket thereon, in which case, the jacket with the metallic ribs and collar, which may be of any desired metal, as for instance, oxidized copper, forms a very sightly ornament. The inner pot alone may, as previously stated, be used, or the collar 38 may be removed and the members 17 and 18 folded back into a roll and strapped together by means of a buckle-strap 44, as clearly shown in dotted lines of Fig. 4. In this case the pot may be left on the base 24 or not as desired.

Having thus described my invention, I claim as new and desire to secure by Letters Patent:

1. A flower-pot comprising, an inner pot, a base on which said inner pot rests, a collar resting on the top of the inner pot, and a jacket secured around and against said base and collar and spaced from said side-wall.

2. An article of the kind described comprising an inner pot, a base having a lower flange, a collar resting on said pot and having an outer flange, and a jacket secured around and against said collar and said base and contacting said flanges.

3. An article of the kind described comprising a base, a fixed rib secured to said base, an inner pot resting on said base, a jacket composed of two members secured at their inner ends to said fixed rib, means at the outer ends of said members for fastening said outer ends together when said jacket is placed around said base, a pair of members forming a hinged collar resting on the top of said pot and having an outer flange which said jacket engages, and means for locking said members of said collar together.

4. An article of the kind described comprising a base, a fixed rib secured to said base, an inner pot resting on said base, a jacket composed of two members secured at their inner ends to said fixed ribs, means at the outer ends of said members for fastening said outer ends together when the jacket is placed around said base, a pair of sections forming a hinged collar resting on the top of said pot and having an outer flange which said jacket engages, means for locking said sections together and a buckle-strap secured to the inner face of said fixed rib and adapted to bind together the jacket members when they are unfastened from each other and rolled together.

In testimony, that I claim the foregoing as my invention, I have signed my name in presence of two subscribing witnesses.

GERSON HERSHKOVITZ.

Witnesses:
PAUL GOEPEL,
FANNIE FISK.